(12) United States Patent
Meyn

(10) Patent No.: US 6,254,471 B1
(45) Date of Patent: Jul. 3, 2001

(54) APPARATUS FOR GRIPPING THE LEGS OF POULTRY

(75) Inventor: Pieter Meyn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 09/493,728

(22) Filed: Jan. 28, 2000

(30) Foreign Application Priority Data

Feb. 2, 1999 (NL) .................................................... 1011200

(51) Int. Cl.[7] .................................................. A22C 21/00
(52) U.S. Cl. ...................... 452/177; 452/452; 452/180; 452/182
(58) Field of Search ................................. 452/177, 179, 452/180, 182, 183, 188

(56) References Cited

U.S. PATENT DOCUMENTS

| 5,129,857 | * | 7/1992 | Keiter et al. ........................ | 452/179 |
| 5,290,187 | * | 3/1994 | Meyn .................................. | 452/179 |
| 5,514,033 | * | 5/1996 | Berry .................................. | 452/183 |
| 5,672,100 | * | 9/1997 | Nielsen et al. ....................... | 452/182 |

FOREIGN PATENT DOCUMENTS

| 145077A | 6/1985 | (EP) . |
| 533288A | 3/1993 | (EP) . |
| 7412044A | 3/1976 | (NL) . |
| 9200676A | 11/1993 | (NL) . |
| 1003230C | 12/1997 | (NL) . |
| 9220223A | 11/1992 | (WO) . |

OTHER PUBLICATIONS

Netherlands Patent Office Search Report, Sep. 16, 1999.
Netherlands Patent Office Search Report, Sep. 14, 1999.

* cited by examiner

*Primary Examiner*—Willis Little
(74) *Attorney, Agent, or Firm*—Dority & Manning

(57) ABSTRACT

An apparatus for gripping the feet of sitting or standing poultry. The apparatus comprising a first conveyor where the poultry sits or stands on the first conveyor and points its head in the same or opposite direction to the direction of travel of the first conveyor. A section of the first conveyor forms a tunnel floor. A tunnel ceiling is disposed above the first conveyor. The distance between the tunnel ceiling and the first conveyor initially decreases in the direction of travel of the first conveyor. A guide extends in the longitudinal direction of the tunnel ceiling and is located between the first conveyor and the tunnel ceiling. The distance between the tunnel ceiling and the first conveyor increases in the direction of travel of the first conveyor at a location proximate to the guide. A second conveyor is located in the direction of travel of the first conveyor substantially after the guide. The breast of the poultry rests on the second conveyor. Gripping members are located in the direction of travel of the first conveyor substantially after the guide. The gripping members engage and enclose the feet of the poultry.

16 Claims, 1 Drawing Sheet

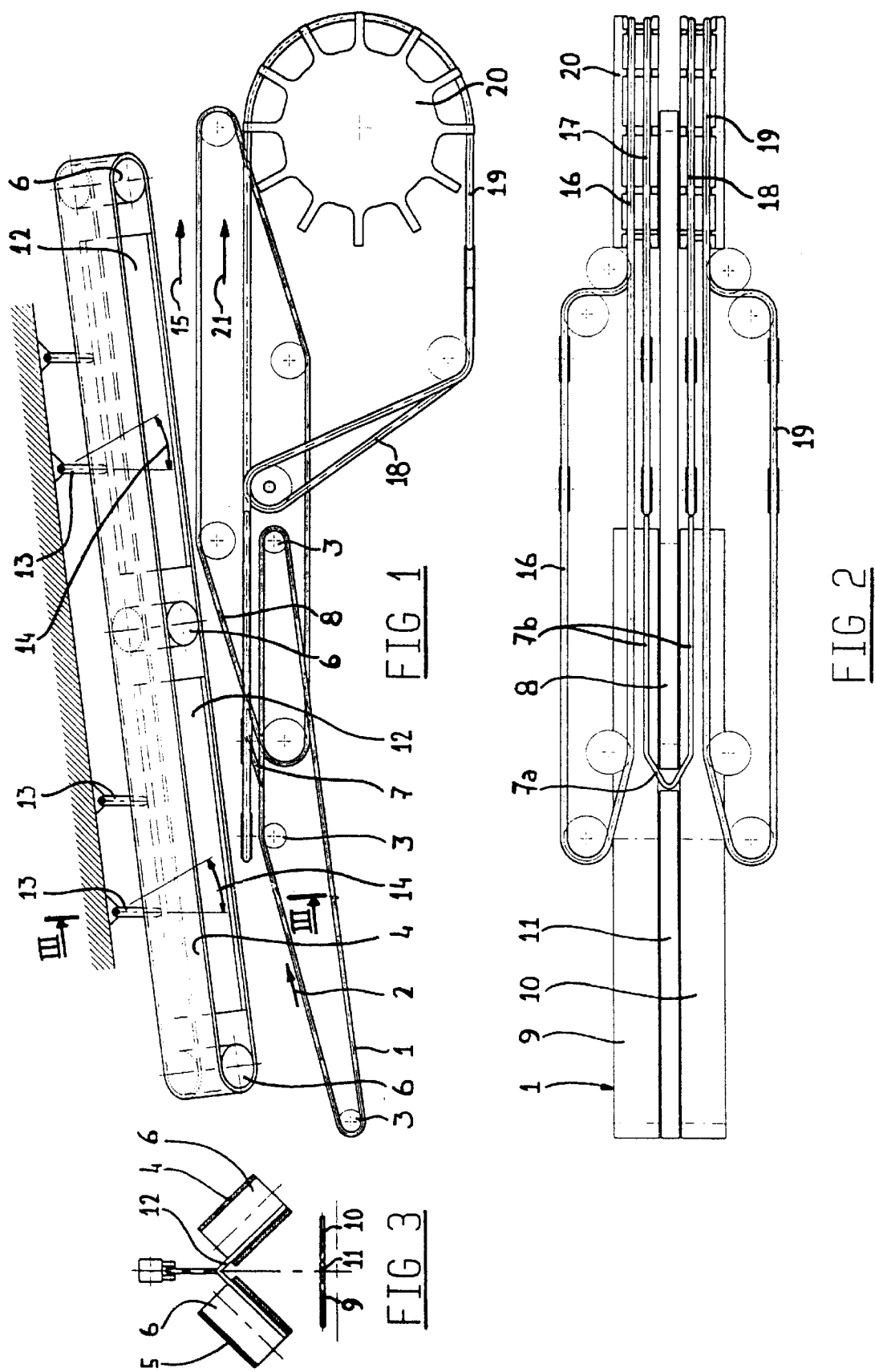

APPARATUS FOR GRIPPING THE LEGS OF POULTRY

BACKGROUND OF THE INVENTION

The invention relates to an apparatus for gripping the feet of sitting or standing poultry supplied on a conveyor and pointing with its head in the same or opposite direction to that of the conveyor.

In preparation of the mechanized slaughter and additional treatment of poultry, the same will generally be suspended by the feet on an overhead conveyor. Presently, this suspending is mostly done manually, since the poultry is being delivered alive and is thus in very varying positions. It is true that many attempts have already been made to automate the suspension of poultry, but a completely satisfactory method, and respective apparatus, has not been developed up till now.

One of the problems, with which one is confronted when one wants to automatically suspend live supplied poultry by the feet is, that the poultry is inclined to sit down on a conveyor belt, so that the feet are not or barely accessible to the mechanical gripping means.

SUMMARY OF THE INVENTION

It is an object of the present invention to provide an apparatus for gripping the feet of poultry which, in a way not further depicted has previously been positioned such that its head points in the same or opposite direction to that of the conveyor, and which poultry is being supplied in standing or sitting position. Additional objects and advantages of the invention will be set forth in part in the following description, or may be obvious from the description, or may be learned through practice of the invention.

For this purpose the apparatus according to the present invention is characterized by a tunnel surrounding, among other things, the conveyor, of which, viewed in the transport direction, the vertical distance between the tunnel ceiling and the conveyor at least initially diminishes. This aids progressive engagement of the head of the poultry, and by a guide extending in the longitudinal direction of the tunnel in the vicinity of the tunnel floor which is formed by the conveyor, of which, viewed in the transport direction, the vertical distance to the conveyor increases at least initially, and which is placed centrally to aid progressive engagement of the breast between the feet of the poultry and finally, by gripping members engaging and enclosing the feet of the poultry.

Surprisingly it has been shown that when the poultry enters said tunnel, by the cooperation between the tunnel ceiling and the guide the poultry takes a position such that the feet are being stretched to make them easily accessible for the gripping means. The underlying mechanism can be elucidated as follows. The decrease in the vertical distance between the tunnel ceiling and the conveyor ensures that the poultry is enclosed inside the tunnel and is sitting in such a way that the position of the feet is known, namely alongside of the body of the poultry. Then the guide engages between the feet below the breastbone, whereby the distance between the breastbone and the conveyor will be increased. Nearly at the same time, the gripping means will enclose the middle section of the foot (the part of the foot between the walking toes and the ankle), since at that moment the position of the feet of the poultry can still be fairly accurately determined. During the further increase of the distance between the guide (the breastbone) and the conveyor the poultry will be enclosed more tightly between the guide and the tunnel ceiling, and be inclined to stretch its feet in order to keep in contact with the floor formed by the conveyor. This aids the feet further in assuming a suitable position with respect to the gripping means. As soon as the feet are gripped in the correct way, the distance between the tunnel ceiling and the conveyor may optionally gradually increase again, slowly releasing the poultry for further processing and/or manipulations.

In order to obtain an optimal positioning of the guide between the feet of the supplied poultry, it is further possible within this framework that the beginning of the guide is formed by a stationary guide in the form of a V, of which the tip is pointing opposite to the direction of transportation. The walking toes will come partly under this V-shaped guide, because the increase in the V-shape causes this automatically. At this point the gripping means come into operation, by which the middle section of the foot becomes enclosed. As in the sitting position the middle section of the foot (almost) horizontal, the increasing V-shaped guide at least causes the walking toes to come underneath it, whereby a slight stretching effect will occur. However, in this horizontal position the ankle itself may also come between the gripping means. The further increase of the distance from the breastbone to the conveyor will increase the stretching effect, so that the middle section of the foot will rotate from a horizontal to a vertical position allowing the gripping means to engage properly between the ankle and the walking toes.

Furthermore, an embodiment of the apparatus according to the invention is mentioned, whereby the guide consists mainly of a conveyor belt with a transport speed that corresponds with that of the conveyor. Although a stationary guide also leads to the desired effect, such a moving guide has the advantage that this also prevents as much as possible any disturbance of the poultry. For, as is known, stress in poultry prior to slaughter leads to an inferior quality of the meat.

Constructively an embodiment of the apparatus is advantageous, whereby at least the tunnel ceiling is being formed by two, viewed in the cross section of the tunnel, reversely positioned V-shaped conveyor belts. The transport speed of these conveyor belts can correspond to the transport speed of the conveyor. In this way the head of the poultry will be pushed down in the desired way, without causing a major disturbance to the poultry.

Within this framework it is further preferred that engaging support parts be applied to the upper side of the inverted V-shaped positioned conveyor belts. These support parts prevent the head of the poultry from shooting through between the two V-shaped positioned conveyor belts at the tip of the V.

Corresponding to another preferred embodiment of the invention it is possible within this framework that the support parts consist of plate portions bent to a V-shape, being enabled by means of a parallelogram construction to offset the effect of gravity or spring action, and to be swivellingly suspended. The suspension by means of a parallelogram construction provides on the one hand a reliable support of the conveyor belts while on the other hand, in order to adjust to various circumstances (poultry of different sizes), it allows an adjustment of the position of the support parts.

Furthermore, it is convenient, when the gripping means are being formed by powered strings extending substantially parallel to the conveyor, that cooperate in pairs in lifting up and gripping the feet of the poultry between them. After the feet of the poultry have been stretched in the above mentioned way, the strings can engage the feet from both sides and clamp them between. Subsequently the poultry is transported further with the help of the strings. The strings can be bearing-supported by spring action, so that the different body sizes of the poultry can again be taken into account.

In order to present the poultry, of which the feet have been griped in the above mentioned way, to the overhead conveyor, it is further preferred that the strings extend around turning wheels for the hanging upside-down of the poultry gripped by the feet between the strings. Initially the poultry can be found in a normal position, either sitting or standing. During the feet's passage through the apparatus, they are being stretched and gripped by the gripping means. Finally, the poultry is becoming suspended upside-down, in which position the poultry can be delivered to an overhead conveyor.

The present invention will be elucidated below with reference to the drawing, in which an embodiment of the apparatus according to the invention is shown.

BRIEF DESCRIPTION OF THE DRAWINGS

FIG. 1 shows, extremely schematically, a side-view of an embodiment of the apparatus according to the invention;

FIG. 2 shows a view from above that shown in FIG. 1 depicting the apparatus without the upper conveyor belts; and FIG. 3 shows a partial cross-section according to III-III in FIG. 1.

DETAILED DESCRIPTION

In FIG. 1 an apparatus according to the present invention is depicted in an embodiment. The apparatus comprises a conveyor 1 with a transport direction indicated by arrow 2. The conveyor 1 supplies sitting or standing poultry (not shown) from the left to the right. By a previous treatment (not further depicted), the poultry has been oriented in such a way that its head is pointing in or opposite to the transport direction 2.

In a well-known way the conveyor 1 rotates around guide rollers 3.

The conveyor 1 forms the floor of a tunnel, of which the ceiling is being formed by two, viewed in cross section (see FIG. 3), inverted V-shaped conveyor belts 4 and 5. The conveyor belts 4 and 5 also rotate around rollers 6.

It is clearly visible that the conveyor belts 4, 5 and the conveyor 1 at least initially decreases in the transport direction 2.

The apparatus further comprises a guide composed of a V-shaped stationary guide 7a followed by a conveyor belt 8. As is especially clearly evident from FIG. 2, the V-shaped guide 7a and the conveyor belt 8 are placed centrally with respect to the conveyor 1. In the present embodiment the conveyor therefore comprises two conveyor belt sections 9 and 10. Preceding the conveyor belt 8, an auxiliary conveyor 11 may be placed between these conveyor belt sections 9 and 10. The latter has to prevent the poultry from falling with its feet between the conveyor belts sections 9 and 10.

As is also clearly evident from FIG. 1, the vertical distance from the guide formed by the V-shaped guide 7a and the conveyor belt 8 to the conveyor 1 increases at least initially, viewed in the transport direction 2.

At this point the following has been observed. In the embodiment depicted in FIG. 1 the vertical distance between the tunnel ceiling (conveyor belts 4, 5) and the conveyor 1 (conveyor belt sections 9 and 10) only decreases in the first part, after which said distance later on even increases. At the place of the increasing distance the guide (the V-shaped guide 7a and the conveyor belt 8) has been placed at an increasing distance to the conveyor 1. Naturally, it is also possible that the two parts with the decreasing vertical distance between the tunnel ceiling and conveyor or the increasing vertical distance between the guide and conveyor, respectively, coincide or overlap.

The conveyor belts 4, 5 are engaged by the support parts 12 comprised of V-shaped bend plates that are suspended in a parallelogram construction by means of bars. These plates 12 support the sections of the conveyor belts 4, 5 that, as will be explained later, engage the head of the passing poultry, preventing in this way that such a head can project upward between the sections.

As a result of the above mentioned parallelogram construction with the bars 13, the support parts 12 can swivel corresponding to the double arrows 14 against gravity or a spring, to adjust to various circumstances (poultry of different sizes).

The conveyor belt 8, of which the transport direction is indicated by the arrow 15, will preferably have the same transport-speed as the conveyor 1. This also applies to the powered strings 16 to 19 that are intended to enclose and grip the feet of the poultry in paris (16 and 17; 18 and 19). These strings 16 to 19 extend among other things around a star-shaped turning wheel 20. The transport direction of the strings is by the arrow 21 indicated in FIG. 1.

The apparatus operates as follows. The poultry, initially sitting or standing and with its head pointing in the same or opposite direction to the direction of transport 2, is supplied by the conveyor 1 from the left to the right. As a result of the decreasing vertical distance between the conveyor 1 and the conveyor belts 4, 5 the head of the poultry is pushed downward. This causes it to sit with the feet in a known position. The walking toes will come under the V-shaped guide 7a. Then the strings 16 and 19 will cooperate with the rearward extensions 7b of the guide 7a to enclose the middle section of the foot of the poultry. This is at this stage in a substantially horizontal position, but with an increasing distance of the conveyor belt 8 to the conveyor 1 (conveyor belts 9 and 10) this will become a vertical position, so that the strings 16 and 19 (and behind the rearmost end of the extensions 7b also the strings 17 and 18) can get a good grip between the ankle and the walking toes.

Finally, the distance from the conveyor belts 4, 5 to the conveyor 1 increases again, so that the poultry is gradually released.

The poultry thus gripped with is feet between strings 16 to 19 is being transported with the aid of the strings around the turning wheel 20 and will ultimately be suspended upside-down from the strings. Subsequently, the poultry can be transferred to an overhead conveyor.

With the aid of the apparatus illustrated, the feet of the poultry can be engaged mechanically and enclosed between the gripping means, which in the embodiment depicted are composed of the strings 16 to 19. Naturally other gripping means are conceivable as well.

The present invention is not limited to the above described embodiment, which may be modified in various ways, all within the scope of the appended claims. It should be appreciated by those skilled in the art that various modifications and variations can be made in the present invention without departing from the spirit and scope of the invention.

What is claimed is:

1. An apparatus for gripping the feet of sitting or standing poultry, comprising:

a first conveyor, said poultry sitting or standing on the first conveyor and pointing with its head in the same or opposite direction to the direction of travel of the first conveyor, a section of the first conveyor forming a tunnel floor;

a tunnel ceiling disposed above the first conveyor, the distance between the tunnel ceiling and the first conveyor initially decreasing in the direction of travel of the first conveyor;

a guide extending in the longitudinal direction of the tunnel ceiling and located between the first conveyor and the tunnel ceiling, the distance between the tunnel ceiling and the first conveyor increases in the direction of travel of the first conveyor at a location proximate to the guide;

a second conveyor located in the direction of travel of the first conveyor substantially after the guide, the breast of said poultry resting on the second conveyor; and gripping members located in the direction of travel of the first conveyor substantially after the guide, the gripping members engaging and enclosing the feet of said poultry.

2. The apparatus of claim 1, wherein the beginning of the guide is V-shaped and pointing in a direction opposite to the direction of travel of the first conveyor.

3. The apparatus of claim 1, wherein the second conveyor has a transport speed corresponding with that of the first conveyor.

4. The apparatus of claim 1, wherein the tunnel ceiling is formed by a first tunnel ceiling belt and second tunnel ceiling belt, the first tunnel ceiling belt and the second tunnel ceiling belt are arranged so that the tunnel ceiling is V-shaped.

5. The apparatus of claim 4, further comprising support parts that are applied to the upper side of the V-shaped tunnel ceiling.

6. The apparatus of claim 5, wherein the support parts consist of plate portions bent to a V-shape, the support parts are swivellingly suspended, the support parts are enabled by a parallelogram construction to offset the effect of gravity or spring action.

7. The apparatus of claim 1, wherein the gripping members are powered string members extending substantially parallel to the first and second conveyors, the powered string members cooperate in pairs in lifting up and gripping the feet of said poultry between the pairs of the powered string members.

8. The apparatus of claim 7, wherein the powered string members extend around turning wheels.

9. An apparatus for gripping the feet of sitting or standing poultry, comprising:

a conveyor, said poultry sitting or standing on the conveyor and pointing with its head in the same or opposite direction to the direction of travel of the conveyor, a section of the conveyor forming a tunnel floor;

a tunnel ceiling disposed over the conveyor, the distance between the tunnel ceiling and the conveyor initially diminishing in distance in the direction of travel of the conveyor;

a guide extending in the longitudinal direction of the tunnel ceiling and located between the conveyor and the tunnel ceiling, the distance between the tunnel ceiling and the conveyor increases in the direction of travel of the conveyor at a location proximate to the guide; and gripping members located in the direction of travel of the conveyor substantially after the guide, the gripping members engaging and enclosing the feet of said poultry.

10. The apparatus of claim 9, wherein the beginning of the guide is stationary, and the beginning of the guide is V-shaped and pointing in a direction opposite to the direction of travel of the conveyor.

11. The apparatus of claim 9, wherein the guide is substantially a conveyor belt, the guide has a transport speed corresponding with that of the conveyor.

12. The apparatus of claim 9, wherein the tunnel ceiling is formed by two conveyor belts arranged so that the tunnel ceiling is V-shaped.

13. The apparatus of claim 12, further comprising support parts that are applied to the upper side of the V-shaped tunnel ceiling.

14. The apparatus of claim 13, wherein the support parts comprise plate portions bent to a V-shape.

15. The apparatus of claim 9, wherein the gripping members are powered string members extending substantially parallel to the conveyor, the powered string members cooperate in pairs in lifting up and gripping the feet of said poultry between the pairs of the powered string members.

16. The apparatus of claim 15, wherein the powered string members extend around turning wheels for the hanging upside down of said poultry, the powered string members grip the feet of said poultry.

* * * * *